United States Patent
Kurihara et al.

(10) Patent No.: US 11,148,617 B2
(45) Date of Patent: Oct. 19, 2021

(54) SOUND INSULATING STRUCTURE

(71) Applicants: HONDA MOTOR CO., LTD., Tokyo (JP); National University Corporation Gunma University, Maebashi (JP)

(72) Inventors: Ikumi Kurihara, Wako (JP); Takashi Kondo, Wako (JP); Yoshihiro Noguchi, Wako (JP); Yuma Tsuboi, Wako (JP); Takao Yamaguchi, Maebashi (JP)

(73) Assignees: HONDA MOTOR CO., LTD., Tokyo (JP); National University Corporation Gunma University, Maebashi (JP)

( * ) Notice: Subject to any disclaimer, the term of this patent is extended or adjusted under 35 U.S.C. 154(b) by 50 days.

(21) Appl. No.: 16/815,264

(22) Filed: Mar. 11, 2020

(65) Prior Publication Data

US 2020/0290528 A1    Sep. 17, 2020

(30) Foreign Application Priority Data

Mar. 14, 2019    (JP) .............................. JP2019-047142

(51) Int. Cl.
  B60R 13/07    (2006.01)
  B60R 13/08    (2006.01)
  (Continued)

(52) U.S. Cl.
  CPC .......... B60R 13/0815 (2013.01); B60R 13/02 (2013.01); B62D 25/00 (2013.01)

(58) Field of Classification Search
  CPC combination set(s) only.
  See application file for complete search history.

(56) References Cited

U.S. PATENT DOCUMENTS

| | | | |
|---|---|---|---|
| 2004/0075299 A1* | 4/2004 | Wieber | ............... B60R 13/0815 296/187.02 |
| 2009/0079216 A1* | 3/2009 | Kuroda | ............... B60R 13/0815 296/39.1 |

(Continued)

FOREIGN PATENT DOCUMENTS

| | | |
|---|---|---|
| JP | 05-193423 | 8/1993 |
| JP | 2003-104135 | 4/2003 |

(Continued)

OTHER PUBLICATIONS

Japanese Notice of Allowance for Japanese Patent Application No. 2019-047142 dated Mar. 2, 2021.

*Primary Examiner* — Lori L Lyjak
(74) *Attorney, Agent, or Firm* — Amin, Turocy & Watson, LLP (57) ABSTRACT

A sound insulating member includes a mass section and spring sections. The mass section is disposed so as to have a gap with respect to an outer panel which divides an internal space of a vehicle body and outside thereof, and includes at least a part which has a planar shaped form. The plurality of spring sections are disposed on the mass section at a side of the mass section facing an outer panel. Each of the spring sections has a hollow film member having airtightness and flexibility, and a gas sealed inside the film member. The film member has a first stepped section and a second stepped section that are formed in a stepped shape in an arrangement direction of the outer panel and the mass section.

9 Claims, 9 Drawing Sheets (51) Int. Cl.
*B60R 13/02* (2006.01)
*B62D 25/00* (2006.01)

(56) References Cited

U.S. PATENT DOCUMENTS

| | | | |
|---|---|---|---|
| 2011/0056763 A1* | 3/2011 | Tanase | B60R 13/0815 |
| | | | 181/295 |
| 2018/0147809 A1 | 5/2018 | Peccetti | |

FOREIGN PATENT DOCUMENTS

| | | |
|---|---|---|
| JP | 2006-123614 | 5/2006 |
| JP | 2009-019495 | 1/2009 |
| JP | 2009-145739 | 7/2009 |
| JP | 2010-265589 | 11/2010 |
| JP | 2018-518397 | 7/2018 |
| JP | 2018-205419 | 12/2018 |

* cited by examiner

SOUND INSULATING STRUCTURE

CROSS-REFERENCE TO RELATED APPLICATION

Priority is claimed on Japanese Patent Application No. 2019-047142, filed Mar. 14, 2019, the content of which is incorporated herein by reference.

BACKGROUND OF THE INVENTION

Field of the Invention

The present invention relates to a sound insulating structure.

Description of Related Art

In a vehicle such as an automobile or the like, a building, or the like, in order to prevent intrusion of noise into an internal space from the outside or leakage of noise to the outside from the internal space, a sound insulating material having a sound insulating performance is provided on a dividing member that divides the outside and the internal space.

For example, Japanese Unexamined Patent Application, First Publication No. 2010-265589 discloses a configuration in which a spacer having a plurality of concave sections is disposed as a sound insulating material between a dividing member (a roof sheet) and a porous base material on a side of an internal space. According to the above-mentioned configuration, noise (sonic waves) intruding from a side of a dividing member enters the concave sections formed in the spacer and is reflected in the concave sections, and thus, a sound insulating performance is exhibited.

In addition, Japanese Unexamined Patent Application, First Publication No. 2003-104135 discloses a configuration in which a urethane layer is placed as a sound insulating material on a dividing member (a vehicle floor plate), and noise is attenuated by the urethane layer such that a sound insulating performance is exhibited. In addition, in this configuration, when a plate-shaped mass layer is placed on the urethane layer, a sound insulating structure in which the mass layer is used as a mass and the urethane layer is used as a spring is provided.

Japanese Unexamined Patent Application, First Publication No. 2006-123614 discloses a configuration in which a sound insulating material formed of a foaming porous material or a fiber material is disposed in a bag formed of a film, and a sealing gas is sealed inside the bag.

SUMMARY OF THE INVENTION

Incidentally, further increases in sound insulating performance are constantly required. For example, in an automobile, in some cases, a material that forms an outer panel of a vehicle body such as a ferrous material has been replaced with an aluminum-based material or a resin-based material in order to improve, for example, a specific fuel consumption or the like due to reduction in car weight. In such case, the sound insulating performance in the outer panel itself may be decreased, and thus the sound insulating performance needs to be further increased.

However, in the related art disclosed in Japanese Unexamined Patent Application, First Publication No. 2010-265589, Japanese Unexamined Patent Application, First Publication No. 2003-104135 and Japanese Unexamined Patent Application, First Publication No. 2006-123614, in order to further increase the sound insulating performance, it is necessary to increase a thickness of the sound insulating material. However, when the thickness of the sound insulating material is increased, the weight and costs increase due to an increase in amount of the sound insulating material used.

An aspect of the present invention is directed to providing a sound insulating structure capable of increasing sound insulating performance while minimizing an increase in weight and costs.

(1) A sound insulating structure according to the present invention includes a mass section that is disposed so as to have a gap with respect to a dividing member which divides an internal space of a structural body and outside thereof and that includes at least a part which has a planar shaped form; and a plurality of spring sections that are disposed on the mass section at a side of the mass section facing the dividing member, wherein each of the spring sections has: a hollow film member having airtightness and flexibility; and a gas sealed inside the film member, and the film member has a stepped section formed in a stepped shape in an arrangement direction of the dividing member and the mass section.

(2) In the aspect of the above-mentioned (1), a sound insulating member may be configured to include the mass section and the spring section, and the sound insulating member may further include a joining layer member that is provided on the spring section at a side of the spring section facing the dividing member and that is joinable to the dividing member.

(3) In the aspect of the above-mentioned (2), the mass section may be formed of polypropylene, the film member may be formed of ethylene-vinyl alcohol copolymer, and the joining layer member may be formed of polyethylene.

(4) In the aspect of any one of the above-mentioned (1) to (3), the mass section may be formed of a material having a specific gravity that is greater than that of the film member of the spring section.

(5) In the aspect of any one of the above-mentioned (1) to (4), the film member of the spring section may be formed of a material having a Young's modulus that is lower than that of the mass section.

(6) In the aspect of any one of the above-mentioned (1) to (5), the plurality of spring sections may be disposed so as to have intervals with each other in a direction along a facing surface that faces the dividing member.

(7) In the aspect of any one of the above-mentioned (1) to (6), the gas may be air.

(8) In the aspect of any one of the above-mentioned (1) to (6), the gas may be carbon dioxide or helium.

(9) In the aspect of any one of the above-mentioned (1) to (8), the structural body may be a vehicle body of an automobile, and the dividing member may be an outer panel of the vehicle body or an inner panel on which interior decorations of the vehicle body are formed.

According to the aspect of the above-mentioned (1), the sound insulating structure is configured with the mass section used as a mass and the spring section used as a spring. Accordingly, a frequency at which the mass section resonates with respect to noise can be adjusted, and noise of a frequency band of an application can be efficiently minimized by appropriately adjusting the mass of the mass section and the spring constant of the spring of the spring section.

Further, since the sound insulating structure has a configuration in which the gas is sealed inside the hollow film member, a used amount of a material that forms the film member is significantly less than that for a urethane layer. Accordingly, even when a thickness of the sound insulating structure in the direction in which the mass section and the dividing member face each other is increased, sound insulating performance can be increased while minimizing an increase in weight and costs.

In addition, since the film member has the stepped section, a cross-sectional area of the stepped section can be adjusted such that it becomes smaller.

Accordingly, a resonance frequency due to the sound insulating structure can be lowered by decreasing the spring constant of the spring section. Accordingly, the sound insulating performance can be further increased while minimizing an increase in weight and costs due to the sound insulating structure.

According to the aspect of the above-mentioned (2), since the sound insulating member is constituted by the mass section and the spring section and the joining layer member is provided on the spring section at a side of the spring section facing the dividing member in the sound insulating member, the sound insulating structure can be joined to the dividing member by the joining layer member, and the dividing member can be easily provided on the sound insulating structure.

According to the aspect of the above-mentioned (3), since the mass section is formed of polypropylene, high formability can be obtained. In addition, since the film member is formed of ethylene-vinyl alcohol copolymer, good airtightness can be obtained and leakage of the gas sealed inside the film member can be minimized.

Further, since the joining layer member is formed of polyethylene, the joining layer member can be easily and reliably joined to the dividing member.

According to the aspect of the above-mentioned (4), since the specific gravity of the mass section is greater than the specific gravity of the film member, a function of the mass section as a mass can be effectively exhibited.

According to the aspect of the above-mentioned (5), since the Young's modulus of the film member is smaller than the Young's modulus of the mass section, the spring section can be easily elastically deformed, and noise can be efficiently minimized.

According to the aspect of the above-mentioned (6), since the plurality of spring sections are provided so as to have intervals with each other in a direction along the facing surface, when the spring section is elastically deformed according to the displacement of the mass section so as to displace toward the side of the dividing member and displace away from the side of the dividing member, the neighboring spring sections can be prevented from absorbing shocks from each other. Accordingly, it is possible to minimize inhibition of deformation of the spring section by the other spring sections, and minimize the noise efficiently.

According to the aspect of the above-mentioned (7), since air is used as the gas sealed inside the film member, reduction in costs can be achieved.

According to the aspect of the above-mentioned (8), since carbon dioxide is used as the gas sealed inside the film member, a sound velocity (a propagation velocity of sonic waves) is decreased such that it is lower than in air, and the sound insulating performance can be improved. In addition, since helium is used as the gas sealed inside the film member, a density is lower than that of air, and the sound insulating performance can be improved.

According to the aspect of the above-mentioned (9), since the sound insulating structure is provided on the outer panel or the inner panel of the vehicle body of the automobile, the sound insulating performance in the internal space of the vehicle body can be improved.

DETAILED DESCRIPTION OF THE INVENTION

Hereinafter, an embodiment of the present invention will be described with reference to the accompanying drawings.

In the drawings, an arrow FR indicates a forward direction with respect to a vehicle, an arrow UP indicates an upward direction with respect to the vehicle, and an arrow LH indicates a leftward direction with respect to the vehicle. In the embodiment, as an example, while a structural body has been described as a vehicle body 1 of an automobile, the structural body is not particularly limited to the vehicle body 1 of the automobile.

Figure 1:
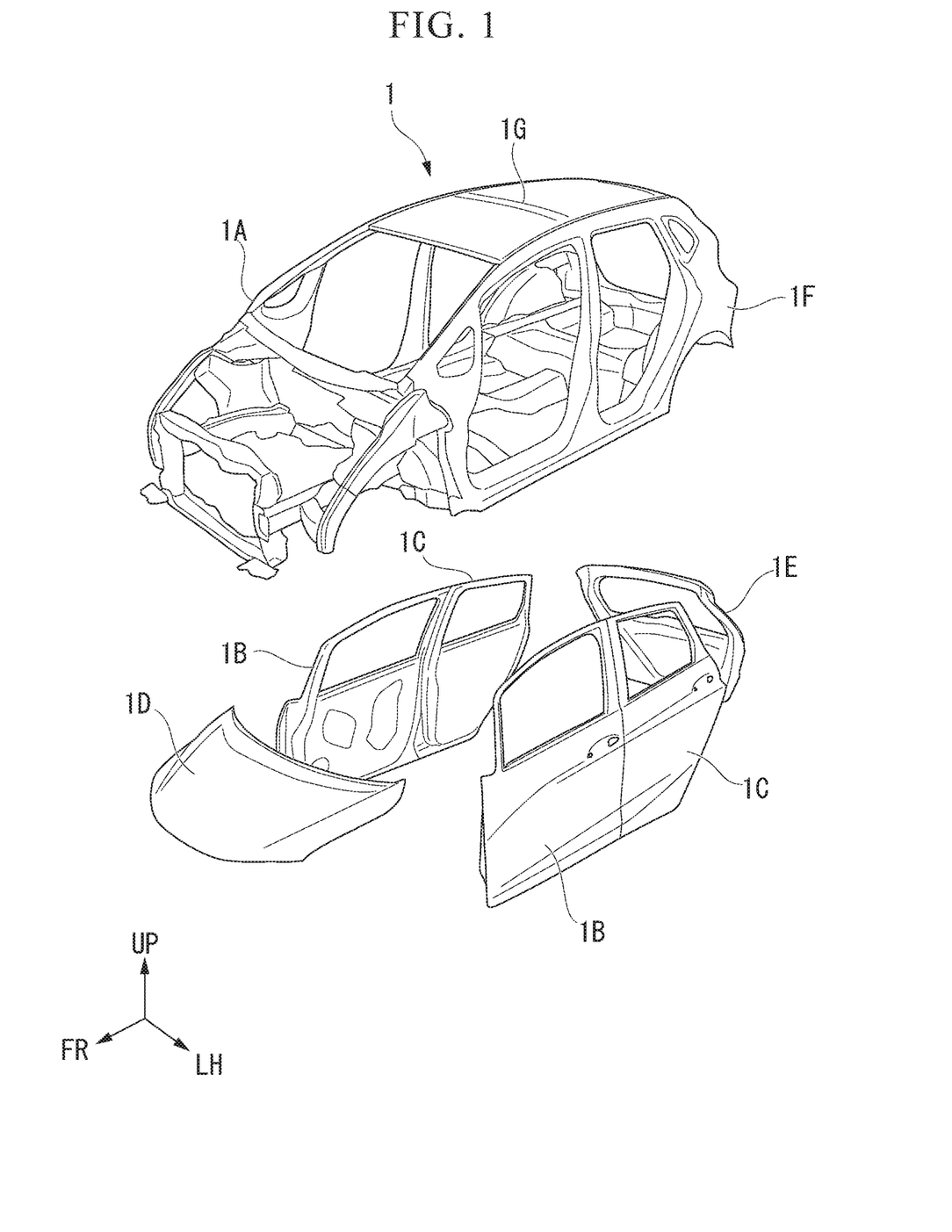
FIG. 1 is an exploded perspective view showing a vehicle body including a sound insulating structure according to an embodiment of the present invention.

As shown in FIG. 1, the vehicle body 1 of the automobile includes a vehicle body main body 1A, left and right front side doors 1B, left and right rear side doors 1C, a bonnet 1D, a tail gate 1E, left and right quarter panels 1F (the right quarter panel 1F is not shown), and a roof member 1G.

Hereinafter, in the embodiment, as an example, while an example in which a sound insulating structure is provided in the roof member 1G will be described, the embodiment is not limited thereto. As another example, for example, the sound insulating structure may also include the left and right front side doors 1B, the left and right rear side doors 1C, the bonnet 1D, the tail gate 1E, the left and right quarter panels 1F, the roof member 1G, and the like.

Figure 2:
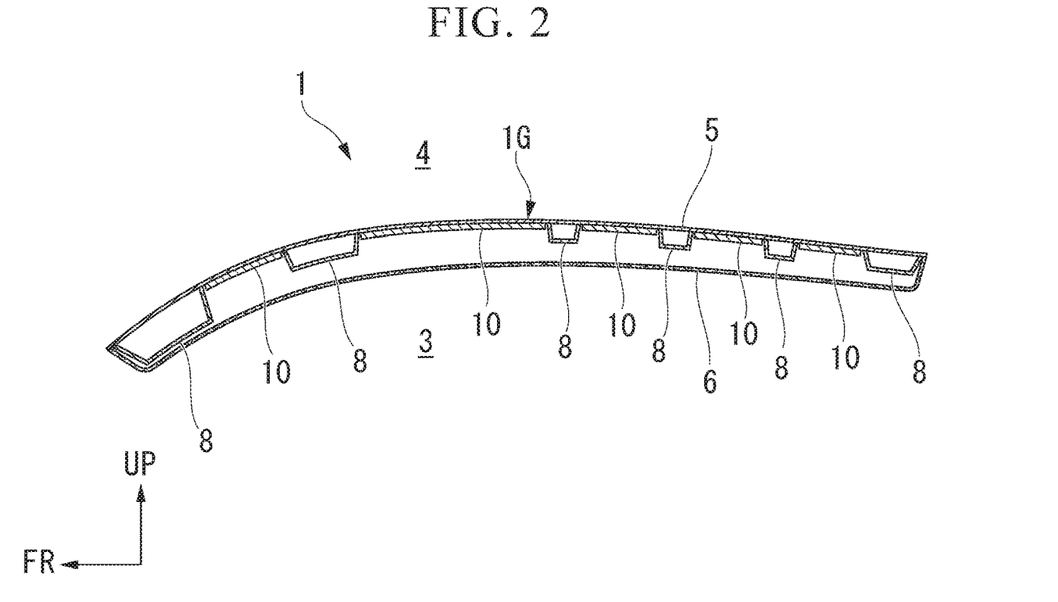
FIG. 2 is a cross-sectional view showing a roof member of the vehicle body including the sound insulating structure according to the embodiment of the present invention.
Figure 3:
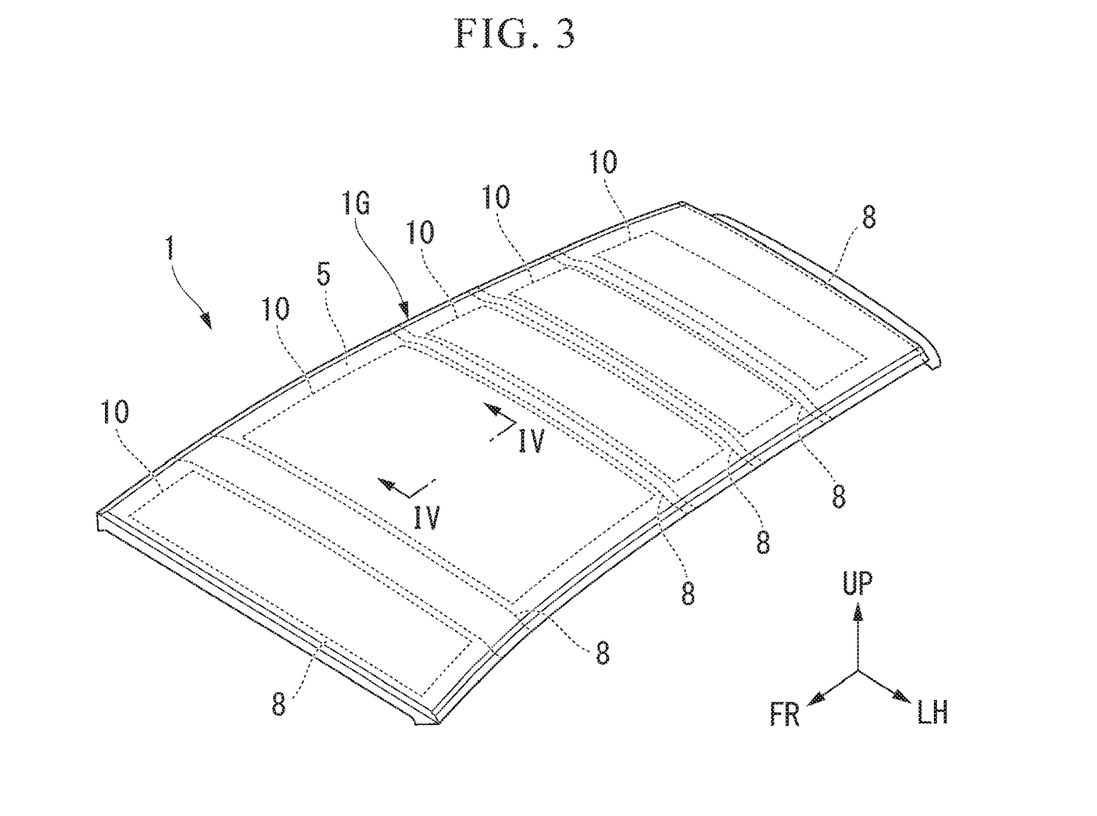
FIG. 3 is a perspective view showing the roof member of the vehicle body including the sound insulating structure according to the embodiment of the present invention from an outward side of a vehicle.

As shown in FIG. 2 and FIG. 3, the sound insulating structure according to the embodiment includes a sound insulating member 10.

The sound insulating member 10 is provided between an outer panel (a dividing member) 5 of the roof member 1G and an inner panel (a roof garnish, a dividing member) 6 facing an internal space 3 in the vehicle body 1 and forming an interior decoration. The sound insulating member 10 is fixed to a lower surface of the outer panel 5.

Figure 4:
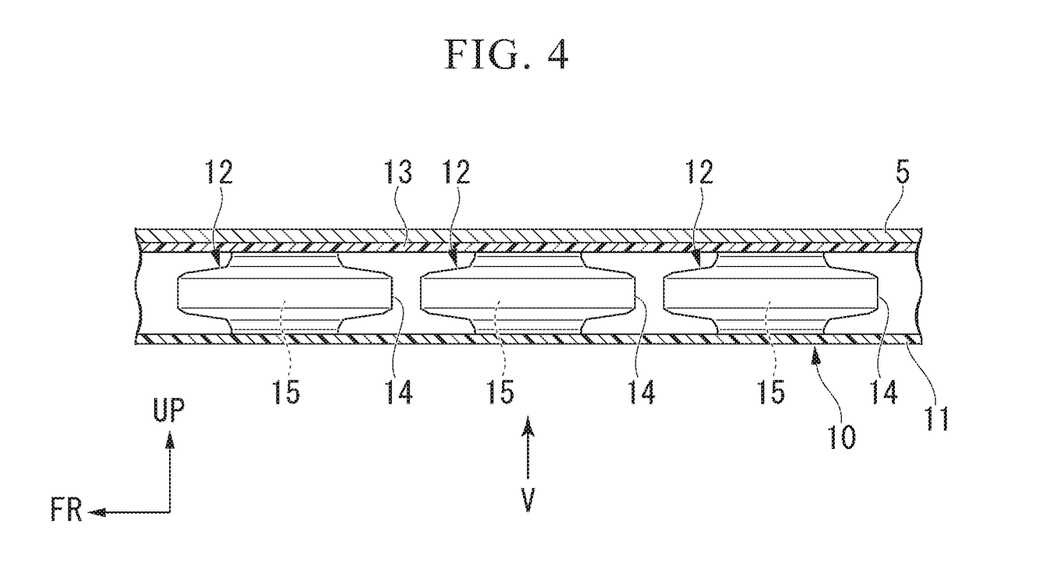
FIG. 4 is a cross-sectional view of the sound insulating structure according to the embodiment of the present invention taken along line IV-IV in FIG. 3.
Figure 5:
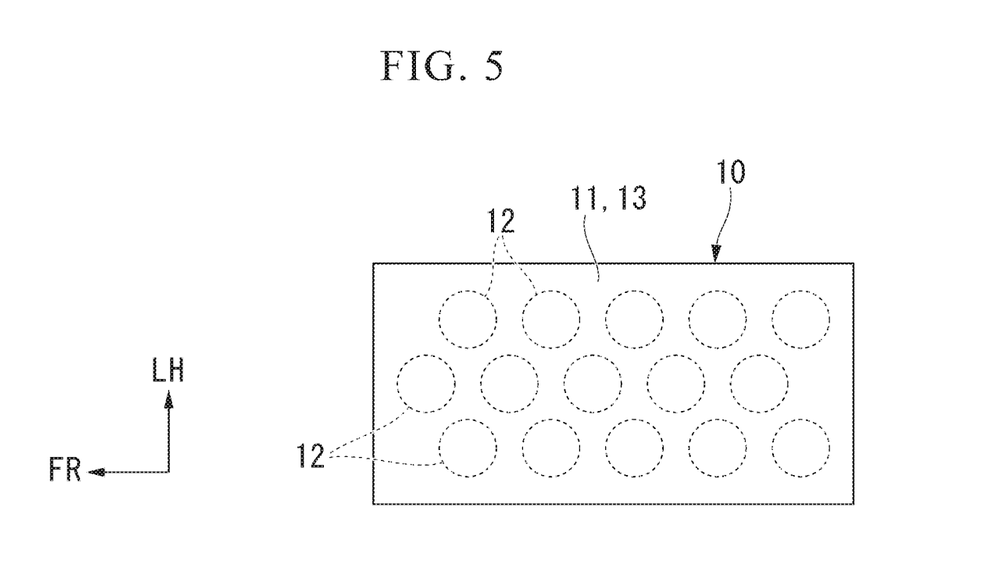
FIG. 5 is a bottom view of disposition of spring sections in the sound insulating structure according to the embodiment of the present invention when seen from a direction of an arrow V in FIG. 4.

As shown in FIG. 4 and FIG. 5, the sound insulating member 10 includes a mass section 11, spring sections 12 and a joining layer member 13. The sound insulating member 10 is disposed in a space between the outer panel 5 and the inner panel 6 (see FIG. 2).

The mass section 11 has, for example, a plate shape, and is disposed so as to have a gap with respect to the outer panel 5 that divides the internal space 3 and an external section 4 (see FIG. 2) of the vehicle body 1. The mass section 11 is preferably formed of a material having a specific gravity greater than that of film members 14 of the spring sections 12, which will be described below, and high formability.

As a material that forms the above-mentioned mass section 11, for example, polypropylene (PP) is preferably used. Further, the mass section 11 is not limited to a plate shape, and may be a member, at least a part of which has a planar shape.

The plurality of spring sections 12 are disposed on the mass section 11 while being arranged along a surface of the mass section 11 that faces the outer panel 5 and while having intervals with each other. In the embodiment, the spring sections 12 are disposed along the mass section 11 in a zigzag manner.

Each of the spring sections 12 has the hollow film members 14, and a gas 15 (see also FIG. 6) sealed inside the film members 14.

Figure 6:
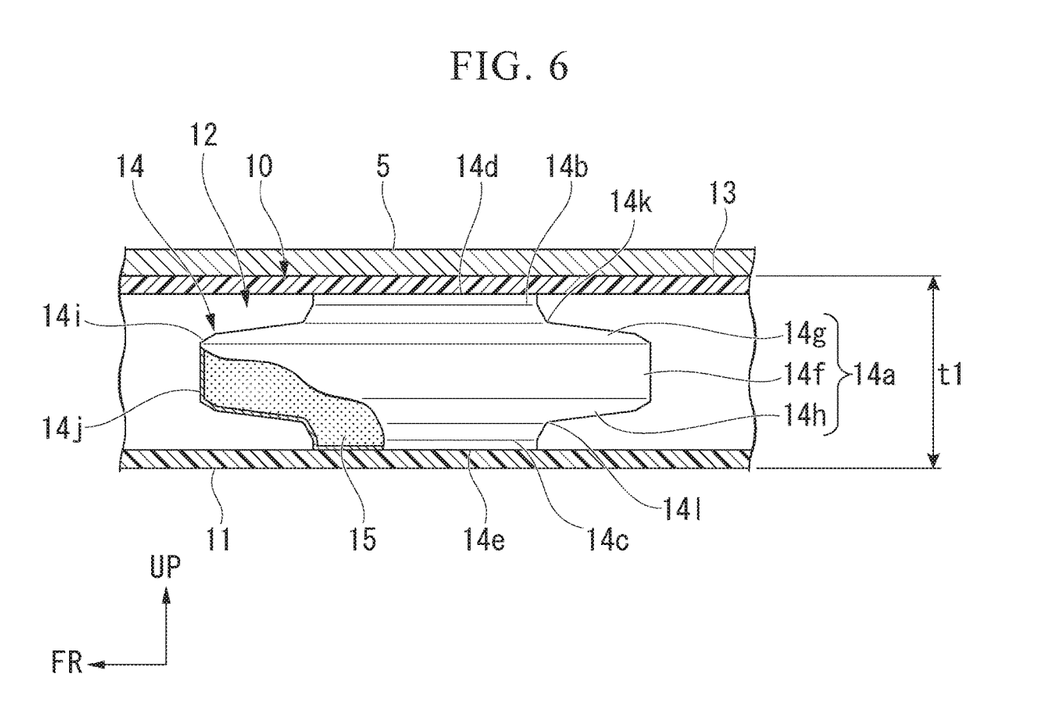
FIG. 6 is a side view showing the sound insulating structure according to the embodiment of the present invention.

As shown in FIG. 6, the film member 14 has a tubular shape extending in a direction in which the mass section 11 and the outer panel 5 face each other as an axis. The film member 14 is formed in a closed container shape including a tubular section 14a, a first stepped section (a stepped section) 14b, a second stepped section (a stepped section) 14c, a first end closing section 14d and a second end closing section 14e, which are integrated. The film member 14 is formed of a material having airtightness and flexibility.

In addition, the film member 14 is preferably formed of a material having a Young's modulus lower than that of the material that forms the mass section 11 such that the film member 14 is more actively elastically deformed than the mass section 11. As the material that forms the above-mentioned film member 14, for example, ethylene-vinyl alcohol copolymer (for example, "Eval" (registered trade name) manufactured by KURARAY Co., Ltd.) is preferably used. Further, "airtightness" provided in the film member 14 is not limited to forming a closed space with no entering and exiting of air, and entering and exiting of some air may be allowed such that the film member 14 can also function as the spring section.

The tubular section 14a has a tubular outer circumferential section 14f, a first disk section 14g and a second disk section 14h. The tubular outer circumferential section 14f is formed in a tubular shape in which a cross-sectional shape seen in the direction in which the mass section 11 and the outer panel 5 face each other is, for example, a circular shape. The first disk section 14g has an outer circumference integrated with a first end portion 14i of the tubular outer circumferential section 14f, and is disposed along the outer panel 5. The second disk section 14h has an outer circumference integrated with a second end portion 14j of the tubular outer circumferential section 14f, and is disposed along the mass section 11.

The first stepped section 14b is formed on the inner circumference of the first disk section 14g. The first stepped section 14b is formed coaxially with the tubular outer circumferential section 14f. The first stepped section 14b is formed in a circular tubular shape such that a cross-sectional shape seen in the direction in which the mass section 11 and the outer panel 5 face each other has a diameter smaller than that of, for example, the tubular outer circumferential section 14f. That is, the first stepped section 14b is set to have a cross-sectional area smaller than that of the tubular section 14a.

A first stepped section 14k is formed in a concave shape by the first stepped section 14b and the first disk section 14g.

The second stepped section 14c is formed on the inner circumference of the second disk section 14h. The second stepped section 14c is formed coaxially with the first stepped section 14b. The second stepped section 14c is formed in a circular tubular shape such that a cross-sectional shape seen in the direction in which the mass section 11 and the outer panel 5 face each other has the same diameter as, for example, the first stepped section 14b. That is, the second stepped section 14c is set to have a cross-sectional area smaller than that of the tubular section 14a.

A second stepped section 14l is formed in a concave shape by the second stepped section 14c and the second disk section 14h.

An end portion (i.e., an end portion on a side of the joining layer member 13) of the first stepped section 14b is closed by the first end closing section 14d. The first end closing section 14d is formed flatly along the outer panel 5. The first end closing section 14d is joined integrally with, for example, the outer panel 5 by the joining layer member 13. The joining layer member 13 will be described below in detail.

An end portion (i.e., an end portion on a side of the mass section 11) of the second stepped section 14c is closed by the second end closing section 14e. The second end closing section 14e is formed flatly along the mass section 11. The second end closing section 14e is joined integrally with, for example, the mass section 11 using an adhesive agent, welding, or the like.

That is, the film member 14 has the first stepped section 14b and the second stepped section 14c that are formed in a stepped shape with respect to an arrangement direction of the outer panel 5 and the mass section 11. Reasons why the first stepped section 14b and the second stepped section 14c are provided on the film member 14 will be stated below in detail.

The hollow film member 14 is filled with the gas 15 to a preset pressure or more such that at least slackening of the film member 14 is removed.

As such as a gas 15, for example, air may be used. In addition, carbon dioxide or helium may be used as the gas 15.

The joining layer member 13 is provided on a side of the spring sections 12 facing the outer panel 5. In the embodiment, the joining layer member 13 is formed in a film shape, and formed to cover the plurality of spring sections 12 (see FIG. 4).

The joining layer member 13 is formed of a material that can be joined to the outer panel 5. In the embodiment, the joining layer member 13 is joined to the outer panel 5 through welding using ultrasonic waves, heat, or the like. For this reason, the joining layer member 13 is preferably formed of a material having good weldability with respect to the outer panel 5. As a material that forms the above-mentioned joining layer member 13, for example, polyethylene (PE) may be used. Further, the joining layer member 13 may be joined to the outer panel 5 by an adhesive layer or an adhesive agent.

Further, while the joining layer member 13 is formed only on the first end closing section 14c of each of the spring sections 12 on the side of the outer panel 5, there is no limitation thereto. As another example, the joining layer member 13 may be provided on the second end closing section 14d of each of the spring sections 12 on the side of the mass section 11 to join the mass section 11.

The mass section 11, the spring sections 12 and the joining layer member 13 that constitute the sound insulating member 10 are integrated by joining them to each other using an adhesive agent, welding, or the like.

As shown in FIG. 2 and FIG. 3, the sound insulating member 10 is provided at a position avoiding a reinforcement frame (a roof cross member) 8 provided on the outer panel 5 with respect to the outer panel 5 of the vehicle body 1. In the embodiment, the sound insulating member 10 is formed in a belt shape between neighboring reinforcement frames 8 in which a direction in which the reinforcement frame 8 extends is oriented in the lengthwise direction. In this way, although the sound insulating member 10 may be formed according to a shape of the outer panel 5, the reinforcement frame 8 provided on the outer panel 5 or disposition of the other members, it is not limited to a quadrangular shape, and may be formed in other various shapes such as a triangular shape or a trapezoidal shape.

Figure 7:
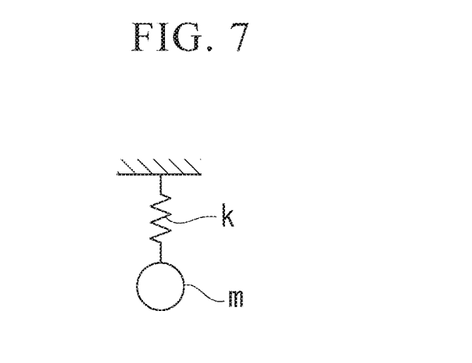
FIG. 7 is a diagrammatic view showing the sound insulating structure according to the embodiment of the present invention.

As shown in FIG. 6 and FIG. 7, the sound insulating member 10 includes the mass section 11 and the spring sections 12, and thus, constitutes a sound insulating structure using the mass section 11 as a mass m and using the spring sections 12 as springs having a spring constant k. In the sound insulating member 10 of the above-mentioned sound insulating structure, the mass m and the spring constant k are adjusted by adjusting the weight of the mass section 11 and the pressure of the gas 15 sealed inside the film members 14 that constitute the spring sections 12.

As described above, the sound insulating member 10 includes the mass section 11 and the spring sections 12, and the spring sections 12 are formed by sealing the gas 15 in the hollow film members 14.

As a result, the sound insulating member 10 can constitute the sound insulating structure using the mass section 11 as the mass m and using the spring sections 12 as the springs having the spring constant k. In addition, the spring constant k of the spring sections 12 can be adjusted by adjusting the pressure of the gas 15 sealed inside the film members 14. Further, since the spring sections 12 have a configuration in which the gas 15 is sealed inside the hollow film members 14, a used amount of the material that forms the film members 14 is greatly smaller than that in the urethane layer. Accordingly, even when the thickness of the spring sections 12 (i.e., a thickness t1 of the sound insulating member 10) in the direction in which the mass section 11 and the outer panel 5 face each other is increased in order to improve the sound insulating performance, an increase in weight and costs of the spring sections 12 can be minimized.

Accordingly, the sound insulating performance can be increased while minimizing an increase in weight and costs.

In addition, the joining layer member 13 is provided on a side of the spring section 12 facing the outer panel 5.

Accordingly, the sound insulating member 10 can be joined and attached to the outer panel 5 by the joining layer member 13.

In addition, high formability can be obtained by forming the mass section 11 using polypropylene. In addition, good airtightness can be obtained and leakage of the gas 15 sealed inside the film members 14 can be minimized by forming the film members 14 using ethylene-vinyl alcohol copolymer. Further, since the joining layer member 13 is formed of polyethylene, the joining layer member 13 can be easily and securely welded to the outer panel 5.

In addition, a specific gravity of the mass section 11 is greater than a specific gravity of the film members 14.

Accordingly, a function of the mass section 11 as the mass can be effectively exhibited.

In addition, a Young's modulus of the film members 14 is lower than a Young's modulus of the mass section 11.

Accordingly, the spring sections 12 can be easily elastically deformed, and noise can be efficiently minimized.

In addition, the plurality of spring sections 12 are provided so as to have intervals with each other in a direction along the facing surfaces.

Accordingly, while the spring sections 12 are elastically deformed according to the displacement of the mass section 11 so as to displace toward the side of the outer panel 5 and displace away from the side of the outer panel 5, the neighboring spring sections 12 can be prevented from absorbing shocks from each other. Accordingly, inhibition of deformation of the spring section 12 by the other spring sections 12 can be minimized, and noise can be efficiently minimized.

In addition, the air was used as the gas 15 sealed inside the film members 14.

Accordingly, reduction in costs of the sound insulating member 10 can be achieved.

In addition, when carbon dioxide is used as the gas 15 sealed inside the film members 14, a sound velocity (a propagation velocity of sonic wave) is decreased further than in the air. Accordingly, the sound insulating performance can be improved.

In addition, when helium is used as the gas 15 sealed inside the film members 14, a density is decreased further than in the air. Accordingly, the sound insulating performance can be improved.

Figure 8:
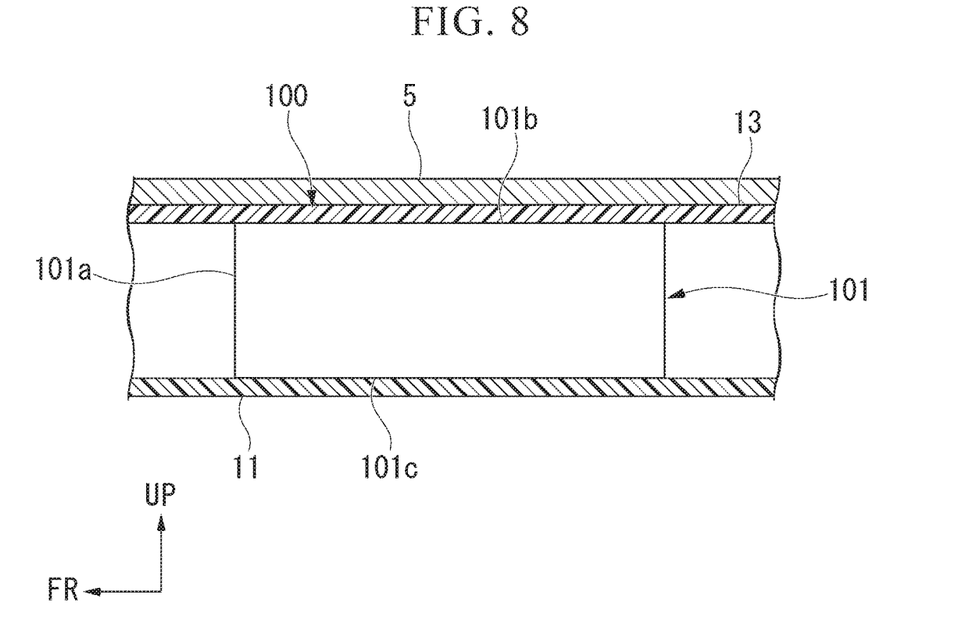
FIG. 8 is a side view showing a sound insulating structure of a comparative example.
Figure 9:
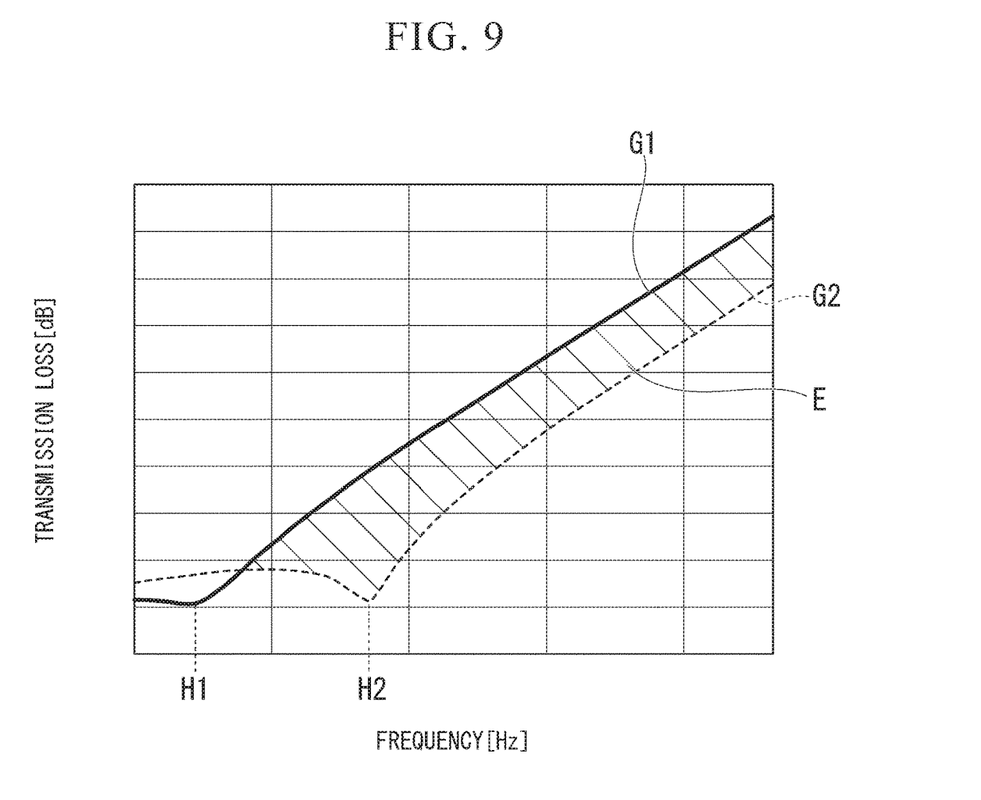
FIG. 9 is a graph showing transmission losses of the sound insulating structure according to the embodiment of the present invention and the sound insulating structure of the comparative example.

Next, reasons why the first stepped section 14b and the second stepped section 14c are provided on the film member 14 will be described with reference to FIG. 6, FIG. 8 and FIG. 9. FIG. 6 shows the sound insulating member 10 of the embodiment, and FIG. 8 shows a sound insulating member 100 of a comparative example. FIG. 9 is a graph showing transmission losses of the sound insulating member 10 and the sound insulating member 100. In the graph of FIG. 9, a vertical axis represents a transmission loss (dB), and a lateral axis represents a frequency (Hz).

As shown in FIG. 8, the sound insulating member 100 of the comparative example is the same as the sound insulating member 10 except that a film member 101 is different from sound insulating member 10 of the embodiment.

The film member 101 is formed in a tubular shape extending in a direction in which the mass section 11 and the outer panel 5 face each other as an axis. The film member 101 has a closed container shape that integrally includes a tubular section 101a having, for example, a circular cross-sectional shape seen in the direction that the mass section 11 and the outer panel 5 face each other, a first end closing section 101b configured to close an end portion of the tubular section 101a on the side of the joining layer member 13, and a second end closing section 101c configured to close an end portion of the tubular section 14a on the side of the mass section 11.

That is, the film member 101 of the comparative example is distinguished from the film member 14 only in that the first stepped section 14b and the second stepped section 14c are removed from the film member 14 of the embodiment shown in FIG. 6, and the other configurations are the same as the film member 14 of the embodiment.

Returning to FIG. 8, since the entire region of the film member 101 of the comparative example is formed with the tubular section 101a, it is difficult to set (adjust) a cross-sectional area to be smaller than that of the film member 14 of the embodiment. Accordingly, in the film member 101, it is difficult to suitably reduce the spring constant of the spring section only by adjusting the pressure of the gas 15 sealed inside the film member 14. For this reason, in the sound insulating member 100 of the comparative example, it is difficult to reduce the resonance frequency.

Meanwhile, as shown in FIG. 6, the film member 14 of the embodiment includes the first stepped section 14b and the second stepped section 14c. The first stepped section 14b and the second stepped section 14c are set (adjusted) to have cross-sectional areas smaller than that of the tubular section 14a. Accordingly, the spring constant k (see FIG. 7) of the spring section 12 can be appropriately reduced. Accordingly, a resonance frequency can be reduced by the sound insulating member 10. Accordingly, the sound insulating performance can be further improved while minimizing an increase in weight and costs due to the sound insulating member 10.

In FIG. 9, a transmission loss of the sound insulating member 10 (see FIG. 6) of the embodiment is shown by a graph G1, and a transmission loss of the sound insulating member 100 (see FIG. 8) of the comparative example is shown by a graph G2. The graph G1 is a resonance frequency H1, and the graph G2 is a resonance frequency H2. The resonance frequency H1 of the graph G1 is lower than the resonance frequency H2 of the graph G2.

Since the resonance frequency H1 of the sound insulating member 10 is lower than the resonance frequency H2 of the sound insulating member 100, the transmission loss of the sound insulating member 10 can be more greatly secured than the transmission loss of the sound insulating member 100. That is, the sound insulating member 10 can increase the sound insulating performance in a range of a region E to be higher than that of the sound insulating member 100.

In this way, in the sound insulating member 100 according to the comparative example shown in FIG. 8, it is difficult to decrease the resonance frequency H2 (see FIG. 9), and it is difficult to secure the transmission loss.

Meanwhile, since the sound insulating member 10 of the embodiment shown in FIG. 6 includes the first stepped section 14b and the second stepped section 14c on the film member 14, the spring constant k (see FIG. 7) of the spring section 12 can be lowered to decrease the resonance frequency H1 (see FIG. 9).

Accordingly, the sound insulating performance can be further increased while minimizing an increase in weight and costs due to the sound insulating member 10. Accordingly, since the sound insulating member 10 is attached to the outer panel 5 of the vehicle body 1 of the automobile shown in FIG. 2, the sound insulating performance in the internal space 3 of the vehicle body 1 can be increased.

Hereinafter, a first variant to a fifth variant of the embodiment will be described with reference to FIG. 10 to FIG. 17. Further, the same or similar components in the first variant to the fifth variant as those in the embodiment are designated by the same reference numerals and detailed description thereof will be omitted.

First Variant of Embodiment

First, the first variant of the embodiment will be described with reference to FIG. 10 and FIG. 11.

Figure 10:
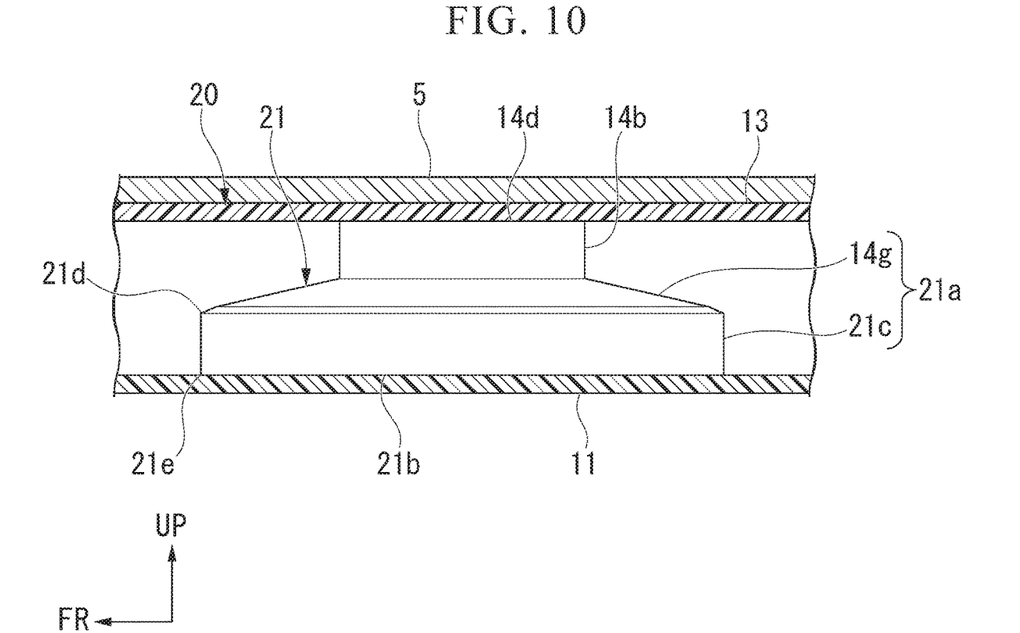
FIG. 10 is a side view of a sound insulating structure according to a first variant of the embodiment of the present invention.

As shown in FIG. 10, a sound insulating member 20 has the same configuration as that of the sound insulating member 10 of the embodiment except that the film member 14 of the embodiment is replaced with a film member 21.

Like the film member 14 of the embodiment, the film member 21 is formed in a tubular shape extending in a direction in which the mass section 11 and the outer panel 5 face each other as an axis. Specifically, the film member 21 is formed in a closed container shape integrally including a tubular section 21a, a first stepped section 14b, a first end closing section 14d and a second end closing section 21b.

The tubular section 21a has a tubular outer circumferential section 21c and a first disk section 14g. Like the tubular outer circumferential section 14f of the embodiment, the tubular outer circumferential section 21c is formed in a tubular shape in which a cross-sectional shape seen from the direction in which the mass section 11 and the outer panel 5 face each other is, for example, a circular shape. An outer circumference of the first disk section 14g is formed integrally with a first end portion 21d of the tubular outer circumferential section 21c.

The first stepped section 14b is formed on the inner circumference of the first disk section 14g. An end portion of the first stepped section 14b on the side of the joining layer member 13 is closed by the first end closing section 14d.

A second end portion 21e of the tubular outer circumferential section 21c on the side of the mass section 11 is closed by the second end closing section 21b. The second end closing section 21b is formed flatly along the mass section 11. Like the second end closing section 14e of the embodiment, the second end closing section 21b is integrally joined to the mass section 11 by, for example, an adhesive agent, welding, or the like.

That is, the film member 21 of the first variant has the first stepped section 14b formed in a stepped shape in an arrangement direction of the outer panel 5 and the mass section 11.

Figure 11:
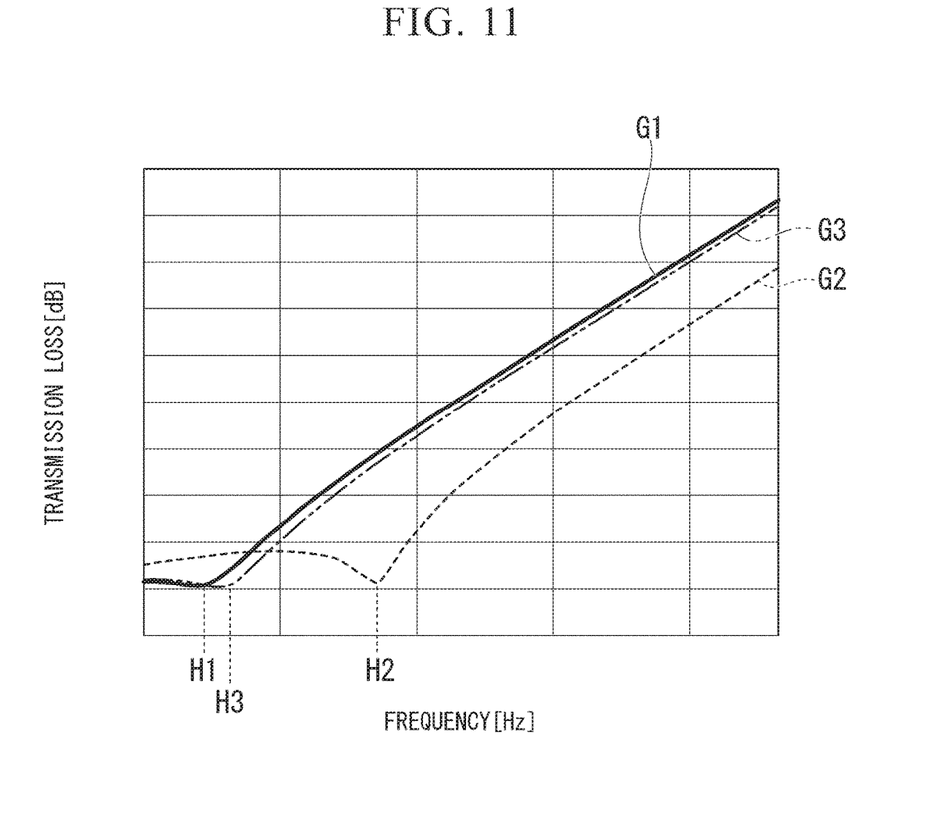
FIG. 11 is a graph showing transmission losses of the sound insulating structure according to the first variant of the embodiment of the present invention and the sound insulating structure of the comparative example.

In FIG. 11, a transmission loss of the sound insulating member 20 of the first variant is shown by a graph G3. A resonance frequency H3 of the graph G3 is substantially the same as the resonance frequency H1 of the graph G1 and is lower than the resonance frequency H2 of the graph G2.

The graph G1 shows a transmission loss of the sound insulating member 10 (see FIG. 6) of the embodiment, and the graph G2 shows a transmission loss of the sound insulating member 100 (see FIG. 8) of the comparative example.

Since the resonance frequency H3 of the sound insulating member 20 is lower than the resonance frequency H2 of the sound insulating member 100, the transmission loss of the sound insulating member 20 can be more greatly secured than the transmission loss of the sound insulating member 100. Accordingly, the sound insulating member 20 can increase the sound insulating performance to be higher than that of the sound insulating member 100.

In this way, since the sound insulating member 20 shown in FIG. 10 includes the first stepped section 14b on the film member 21, the spring constant of the spring section can be lowered to reduce the resonance frequency H3 (see FIG. 10). Accordingly, like the sound insulating member 10 of the embodiment, the sound insulating performance can be further increased while minimizing an increase in weight and costs due to the sound insulating member 20. Accordingly, since the sound insulating member 20 is attached to the outer panel 5 of the vehicle body 1 of the automobile shown in FIG. 2, the sound insulating performance in the internal space 3 of the vehicle body 1 can be increased.

In the sound insulating member 20 of the first variant, while the example in which the first end closing section 14d configured to close the first stepped section 14b is joined to the outer panel 5 via the joining layer member 13 has been described, there is no limitation thereto. As another example, the second end closing section 21b configured to close the tubular section 21a may also be joined to the outer panel 5 via the joining layer member 13. In this case, the first end closing section 14d configured to close the first stepped section 14b is joined to the mass section 11.

Second Variant of Embodiment

Figure 12:
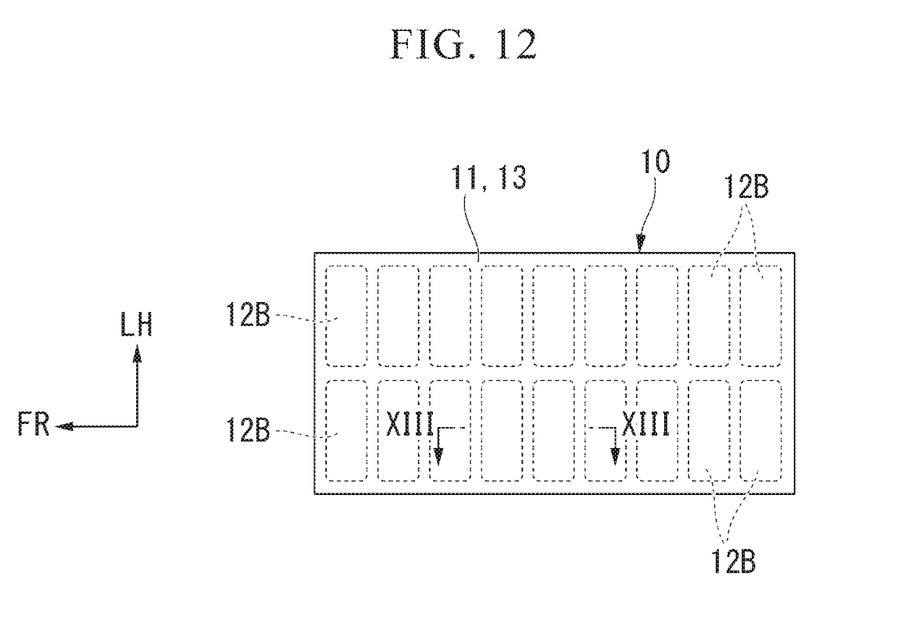
FIG. 12 is a bottom view showing disposition of spring sections in a sound insulating structure according to a second variant of the embodiment of the present invention.
Figure 13:
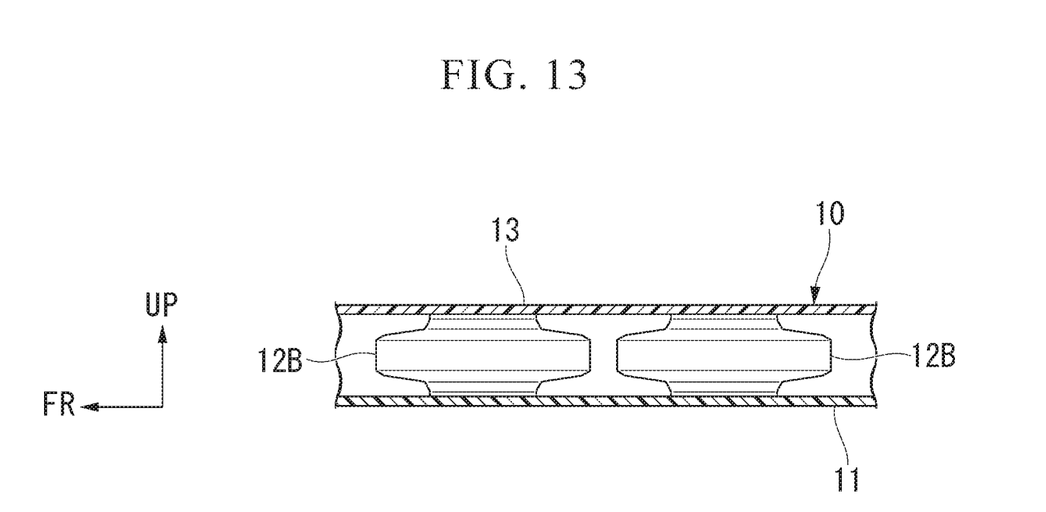
FIG. 13 is a cross-sectional view of the sound insulating structure according to the second variant of the embodiment of the present invention taken along line XIII-XIII in FIG. 12.

Next, a second variant of the embodiment will be described with reference to FIG. 12 and FIG. 13.

In the embodiment, while each of the spring sections 12 (see FIG. 6) has a circular cross section, there is no limitation thereto. For example, as shown in FIG. 12 and FIG. 13, a spring section 12B may be formed in a substantially rectangular shape having a cross-sectional area larger than that of the spring section 12 of the embodiment. Accordingly, a sealing area of the gas 15 in the spring section 12B can be increased to be larger than that in the spring section 12 of the embodiment.

In this case, an interval between the neighboring spring sections 12B may be smaller than the interval between the spring sections 12 of the embodiment.

Third Variant of Embodiment

Next, a third variant of the embodiment will be described with reference to FIG. 14.

Figure 14:
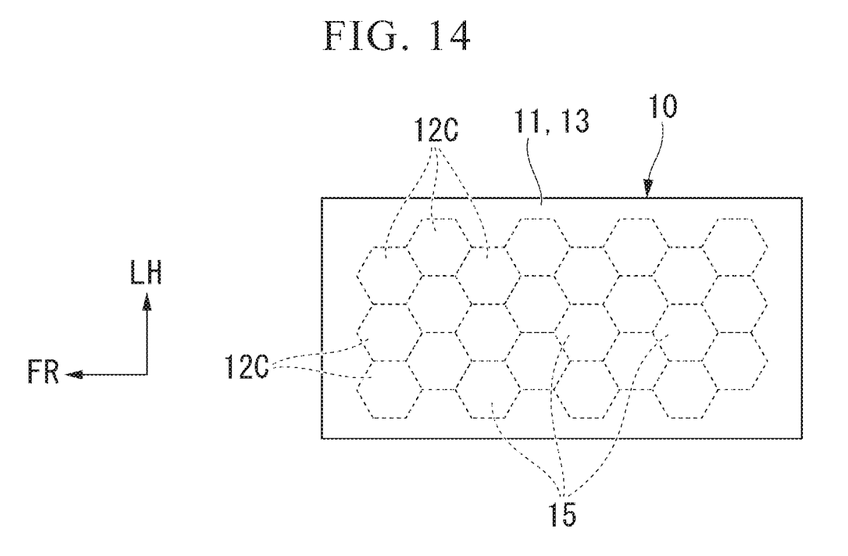
FIG. 14 is a bottom view showing disposition of spring sections in a sound insulating structure according to a third variant of the embodiment of the present invention.

As shown in FIG. 14, the spring sections 12C may be formed in a so-called honeycomb shape in which the spring sections 12C have hexagonal cross sections and are disposed with no gap. Since the spring sections 12C are formed in the honeycomb shape, a sealing area of the gas 15 in the spring sections 12C can be increased to be larger than that in the spring sections 12 of the embodiment.

Fourth Variant of Embodiment

Next, a fourth variant of the embodiment will be described with reference to FIG. 15 and FIG. 16.

Figure 15:
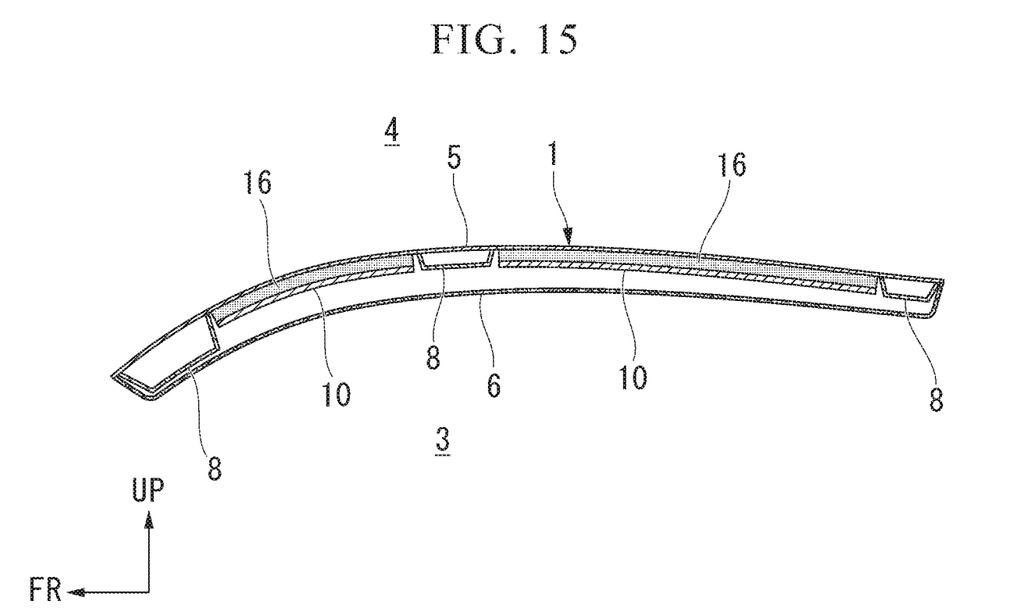
FIG. 15 is a cross-sectional view showing a roof member of a vehicle body including a sound insulating structure according to a fourth variant of the embodiment of the present invention.
Figure 16:
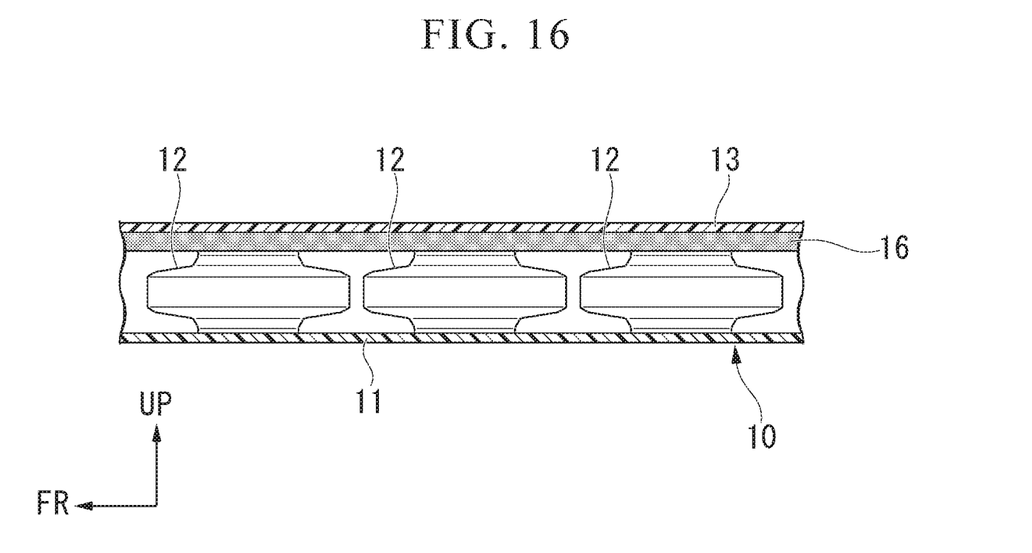
FIG. 16 is an enlarged cross-sectional view of a major part of the sound insulating structure according to the fourth variant of the embodiment of the present invention.

In the above-mentioned sound insulating member 10, as shown in FIG. 15 and FIG. 16, a hard board material 16 may also be added to the side of the joining layer member 13. In this case, the board material 16 may be formed of a resin material or the like that is harder than that of the film members 14. The above-mentioned board material 16 can be provided to be sandwiched between the spring sections 12 and the joining layer member 13.

Fifth Variant of Embodiment

Next, a fifth variant of the embodiment will be described with reference to FIG. 17.

Figure 17:
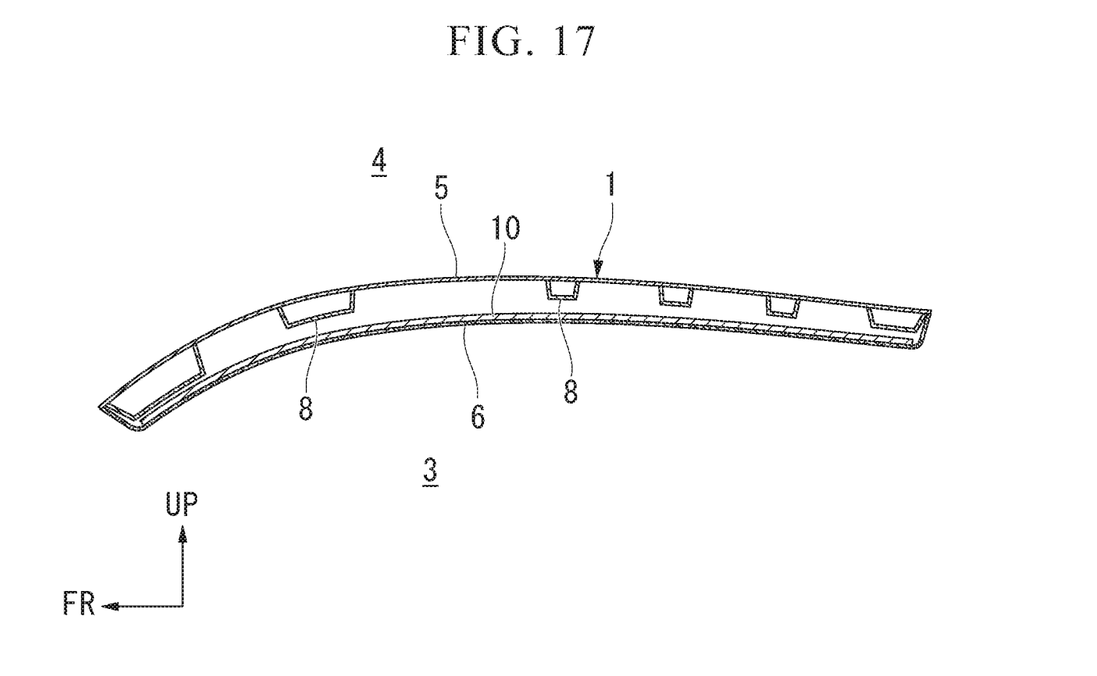
FIG. 17 is a cross-sectional view showing a roof member of a vehicle body including a sound insulating structure according to a fifth variant of the embodiment of the present invention.

As shown in FIG. 17, for example, the sound insulating member 10 can be attached to the side of the inner panel 6 other than the side of the outer panel 5. In this case, the sound insulating member 10 can join the joining layer member 13 to the inner panel 6, and the mass section 11 can be provided to be disposed on the side of the outer panel 5.

Further, the present invention is not limited to the above-mentioned embodiment and the variants thereof, which are described with reference to the accompanying drawings, and various variants are considered without departing from the scope of the present invention.

For example, the mass section 11 and the film members 14 and 21 may be formed integrally with each other. Accordingly, there is no need to separately join the mass section 11 and the film members 14 and 21, and the sound insulating member 10 can be efficiently manufactured.

For example, in the embodiment and the variants thereof, while the sound insulating member 10 is provided on the roof member 1G of the vehicle body 1, there is no limitation thereto. The sound insulating member 10 may be provided on another area such as the left and right front side doors 1B, the left and right rear side doors 1C, the bonnet 1D, the tail gate 1E, the left and right quarter panels 1F, the roof member 1G, or the like. In addition, the sound insulating member 10 may be provided on another structural body such as a ceiling, a wall, a floor of a building, covers of various devices, or the like, in addition to the automobile.

While the sound insulating structure is easily manufactured and handled by configuring the sound insulating member 10 independently from the vehicle body 1, the sound insulating structure including the mass section 11 and the spring sections 12, 12B and 12C may be configured to be directly provided on the dividing member.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A sound insulating structure comprising:
a mass section that is disposed so as to have a gap with respect to a dividing member which divides an internal space of a structural body and outside thereof and that includes at least a part which has a planar shaped form; and a plurality of spring sections that are disposed on the mass section at a side of the mass section facing the dividing member, wherein each of the spring sections has:

a hollow film member having airtightness and flexibility; and a gas sealed inside the film member, and the film member has a stepped section formed in a stepped shape in an arrangement direction of the dividing member and the mass section.

2. The sound insulating structure according to claim 1, wherein a sound insulating member is configured to include the mass section and the spring section, and the sound insulating member further includes a joining layer member that is provided on the spring section at a side of the spring section facing the dividing member and that is joinable to the dividing member.

3. The sound insulating structure according to claim 2, wherein the mass section is formed of polypropylene, the film member is formed of ethylene-vinyl alcohol copolymer, and the joining layer member is formed of polyethylene.

4. The sound insulating structure according to claim 1, wherein the mass section is formed of a material having a specific gravity that is greater than that of the film member of the spring section.

5. The sound insulating structure according to claim 1, wherein the film member of the spring section is formed of a material having a Young's modulus that is lower than that of the mass section.

6. The sound insulating structure according to claim 1, wherein the plurality of spring sections are disposed so as to have intervals with each other in a direction along a facing surface that faces the dividing member.

7. The sound insulating structure according to claim 1, wherein the gas is air.

8. The sound insulating structure according to claim 1, wherein the gas is carbon dioxide or helium.

9. The sound insulating structure according to claim 1, wherein the structural body is a vehicle body of an automobile, and the dividing member is an outer panel of the vehicle body or an inner panel on which interior decorations of the vehicle body are formed.

* * * * *